United States Patent [19]

Mashimo

[11] Patent Number: 5,208,794
[45] Date of Patent: May 4, 1993

[54] OPTICAL DISK APPARATUS HAVING A STATIONARY OPTICAL SYSTEM AND A MOVABLE OPTICAL SYSTEM

[75] Inventor: Akira Mashimo, Tokyo, Japan

[73] Assignees: TEAC Corporation, Japan; Mitsubishi Electric Corporation, Japan

[21] Appl. No.: 686,689

[22] Filed: Apr. 17, 1991

[30] Foreign Application Priority Data

Apr. 19, 1990 [JP] Japan .................. 2-104321

[51] Int. Cl.$^5$ .............................................. G11B 7/00
[52] U.S. Cl. ............................ 369/44.27; 369/114
[58] Field of Search ............... 369/44.27, 44.11, 44.14, 369/44.21, 44.22, 44.28, 54, 59, 112, 114, 115, 119, 75.1, 32, 244

[56] References Cited

U.S. PATENT DOCUMENTS

| | | | |
|---|---|---|---|
| 4,959,824 | 9/1990 | Meda et al. | 369/44.14 |
| 4,977,552 | 12/1990 | Gotoh | 369/44.14 |
| 5,023,858 | 6/1991 | Nakayama | 369/112 |
| 5,068,843 | 11/1991 | Takeshita et al. | 369/44.27 |

Primary Examiner—Andrew L. Sniezek
Assistant Examiner—Nabil Hindi
Attorney, Agent, or Firm—Andrus, Sceales, Starke & Sawall

[57] ABSTRACT

An optical disk apparatus includes a stationary optical portion having a light source and a first opening through which a beam emitted from the light source passes, and a movable optical portion which moves linearly with respect to the stationary optical portion and which receives the beam from the light source through a second opening of the movable optical portion and irradiates the beam to an optical disk. The optical disk apparatus also includes a non-operating status detection part for detecting a predetermined non-operating status of the optical disk apparatus, and a controller for moving the movable optical portion to a contact position where the movable optical portion is in contact with the stationary optical portion so that the first opening of the stationary optical portion is in contact with the second opening of the movable optical portion when the non-operating status detection part detects the predetermined non-operating status.

13 Claims, 7 Drawing Sheets

OPTICAL DISK APPARATUS HAVING A STATIONARY OPTICAL SYSTEM AND A MOVABLE OPTICAL SYSTEM

BACKGROUND OF THE INVENTION

The present invention relates to an optical disk apparatus such as a compact disk apparatus, optical file apparatus or the like, and more particularly, relates to an optical disk apparatus of a configuration where a stationary optical portion and a movable optical portion of the optical pickup are separated. Efforts are progressing to shorten the access time and to have high-speed access operation in optical disk apparatus where a laser beam from a laser light source is irradiated to an optical disk. In particular, it is important to lighten the optical pickup in order to have higher access operation. However, there is a limit to the degree to which the optical pickup ca be made smaller and lighter.

With respect to this, there has been proposed a separated type of optical system pickup where the movable portion and the stationary portions are separated. FIG. 1 shows the configuration of a conventional optical disk apparatus. A stationary optical portion 1 of a separated type optical pickup of an optical disk apparatus includes a laser diode 2 that functions as a laser light source, and a beam splitter 3. A movable optical portion 4 of the separated type optical pickup is made up of a prism 6 that reflects the light beam that is irradiated from the stationary optical portion 1, and an object lens 7 that irradiates the light beam to a optical disk 5. The prism 6 has a reflecting surface 6a serving as a light receiving surface. The movable optical portion 4 is provided so that it can move linearly in the direction of the radius of the optical disk 5. In this manner, it is possible to carry out access operation at a high speed since only the movable optical portion 4 is driven.

However, in such a configuration where the stationary optical portion 1 and movable optical portion 4 are separated, the light emitting surface 3a of the beam splitter 3 of the stationary optical portion 1, the reflecting surface 6a of the prism 6 of the movable optical portion 4, and the surface of the object lens 7 are exposed to the outside. Thus, it is easy for dust and the like to adhere to these exposed portions. An optical disk apparatus to which dust is adhered has a deteriorated recording and deteriorated reproduction characteristics. In addition, the cleaning of the surface of the object lens 7 may be easy but when dust has contaminated the light emitting surface 3a of the beam splitter 3 and the reflecting surface 6a of the prism 6, it is necessary to clean them using a cotton swab which has been dipped in alcohol. Performing such cleaning must be performed by disassembling the optical disk apparatus that has been precisely assembled, since there is no space for cleaning. In addition, disassembling the optical disk apparatus involves the danger of damage to the precision portions and so it is practically impossible for such cleaning to be performed by a general user. In may be possible to provide a glass plate for protection. However, the existence of such a glass plate deteriorates, the optical characteristices.

Furthermore, it may be possible to provide a filter and fan inside the apparatus to form a dustproof structure directed to preventing the entry of dust to inside the apparatus. However, this dustproof structure increases the number of parts and involves trouble in the assembly, and cannot prevent the adhesion of dust to the exposed portions of the optical system.

SUMMARY OF THE INVENTION

Accordingly, a general object of the present invention is to provide a novel and useful optical disk apparatus in which the above described problems of the conventional technology are eliminated.

A further specific object of the present invention is to provide an optical disk apparatus that can efficiently and effectively prevent the adhesion of dust to the light receiving surface of the movable optical portion and to the light emitted surface of the stationary optical portion.

These objects are achieved by an optical disk apparatus comprising a stationary optical portion having a light source and a first opening through which a beam emitted from the light source passes; a movable optical portion which moves linearly with respect to the stationary optical portion and which receives the beam from the light source through a second opening of the movable optical portion and irradiates the beam to an optical disk; non-operation status detection means for detecting a predetermined non-operation status of the optical disk apparatus; and control means for moving the movable optical portion to a contact position where the movable optical portion is in contact with the stationary optical portion so that the first opening of the stationary optical portion is in contact with the second opening of the movable optical portion when the non-operation status detection means detects the predetermined non-operation status.

DESCRIPTION OF THE PREFERRED EMBODIMENTS

Figure 1:
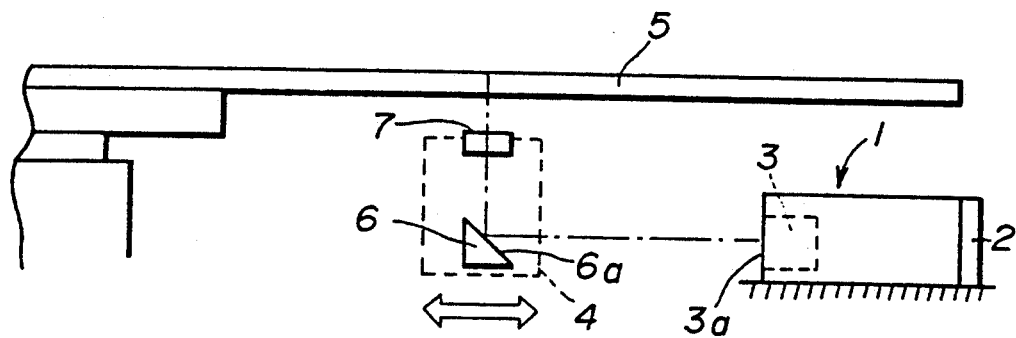
FIG. 1 is a diagram showing the outline of a conventional optical disk apparatus.
Figure 2:
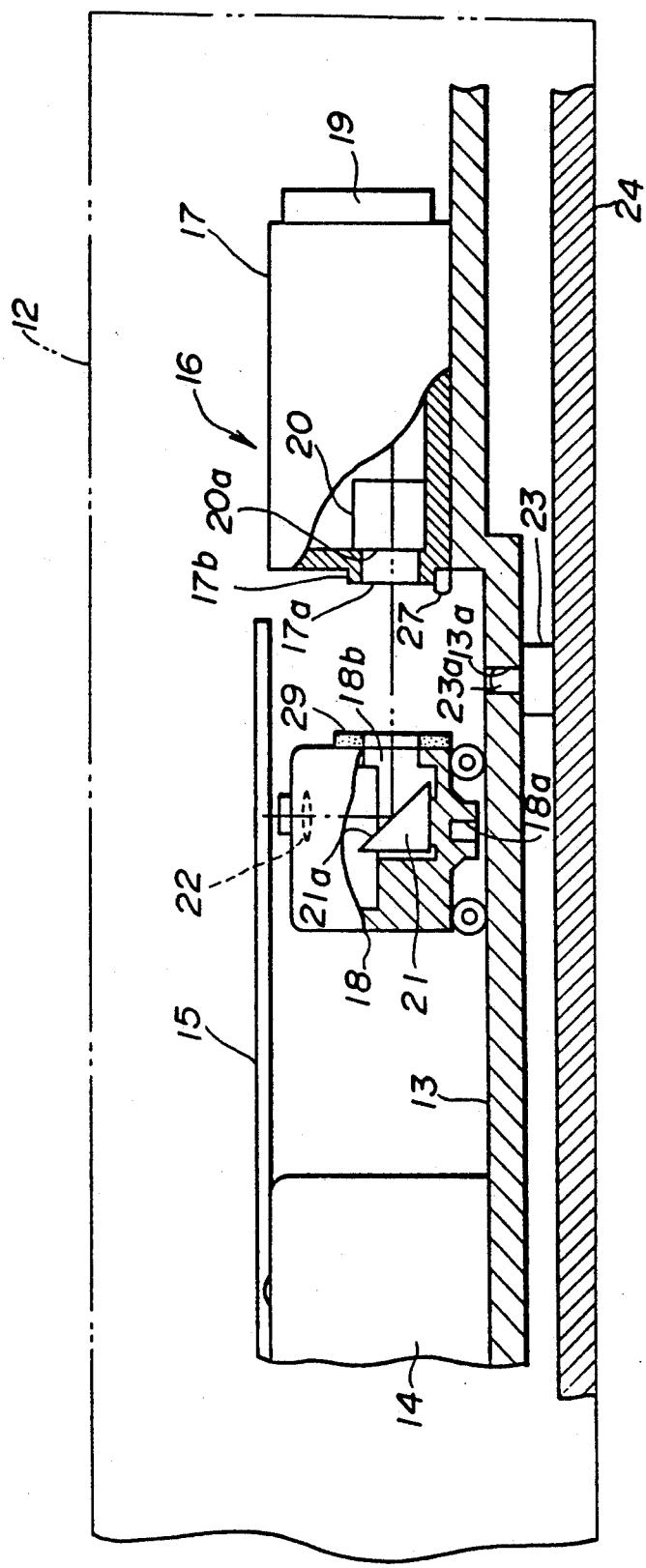
FIG. 2 is a longitudinal sectional view of an optical disk apparatus according to a first embodiment of the present invention.

FIG. 2 shows an optical disk apparatus according to a first embodiment of the present invention. A disk motor 14 is provided on a chassis 13 inside an apparatus main unit 12 of an optical disk apparatus 11. An optical disk 15 is rotated by the disk motor 14. A separated type optical pickup 16 is provided on the chassis 13 of the optical disk apparatus 11 so as to promote high speed access operation. The optical pickup 16 is made up of a stationary optical portion 17 that is fixed on the chassis 13, and a movable optical portion 18 that moves linearly with respect to the stationary optical portion 17. The stationary optical portion 17 has a laser diode 19 which functions as a light source, a beam splitter 20 that allows the laser beam emitted from the laser diode 19 to pass. The beam splitter 20 is provided so that the light emitting surface 20a opposes an aperture or opening 17a (irradiation aperture portion) of the stationary optical portion 17.

The movable optical portion 18 is driven by a motor 26 (shown in FIG. 3) so that it moves in the direction of the radius of the optical disk 15. The movable optical portion 18 is provided with a prism 21 that reflects the laser beam that passes through the beam splitter 20, in the upward direction, and an object lens 22 that irradiates the laser beam that is reflected by the prism 21, to the optical disk 15.

The bottom surface of the movable optical portion 18 has a concave portion 18a for engagement, and a solenoid 23 provided between a bottom surface 24 and a lower surface of the chassis 13. This solenoid 23 has a lock pin 23a, which passes through a hole penetrating the lower surface of the chassis 13. This lock pin 23a receives a magnetic force and engages with the concave portion 18a of the movable optical portion 18, as will be described in detail later.

Figure 3:
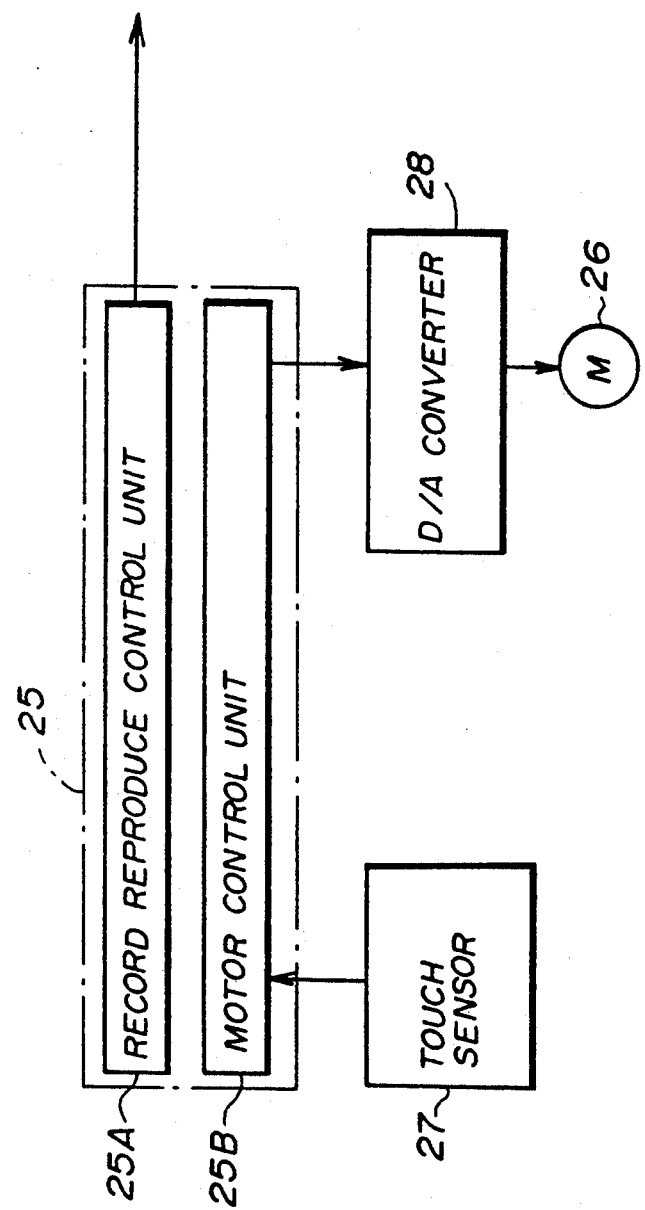
FIG. 3 is a block diagram illustrating the outline configuration of a control circuit used in the present invention.

FIG. 3 is a block diagram showing the outline configuration of a control circuit used in the present invention. The control circuit 25 rotates the optical disk 15, and controls the optical disk apparatus 11. The control circuit 25 has a motor control unit 25B, which controls a motor 26 that drives the movable optical portion 18 in the direction of the radius of the optical disk 15, and a recording and reproduction control unit 25A which controls a recording and reproduction operation in which the laser beam from the laser diode 19 is irradiated to the optical disk 15.

The motor control unit 25B supplies a digital drive signal to the motor 26 via a D/A converter 28 and shifts the movable optical portion 18 to the track position of the outermost periphery. A touch sensor 27 detects that the movable optical portion 18 has moved to the track position of the outermost periphery. This touch sensor 27 is mounted to the end surface of the stationary optical portion 17. In addition, the touch sensor 27 is electrically connected to the motor control unit 25B.

Moreover, the end surface of the movable optical portion 18 has a rubber flexible member 29, which faces the fixed optical portion 17 and functions to relax the impact generated when the movable optical portion 18 touches the stationary optical portion 17. This flexible member 29 is formed into a ring shape around the periphery of the aperture 18b (light receiving aperture) of the movable optical portion 18, and is in close contact with the stationary optical portion 17 without having any gaps between the movable optical portion 18 and the stationary optical portion 17 when they come into contact with each other.

Other than the recording and reproduction mode that operates as has been described above, there are also modes such as an idle mode, a save mode and a stop mode. In the idle mode, the movable optical portion 18 is performing a focusing or tracking operation in the state where the optical disk 15 is driven. In the save mode, the disk motor 14 drives the optical disk 15. In the stop mode, only an interface portion to control circuit 25 is operating and the optical disk 15 and the movable optical portion 18 are stopped.

Figure 4:
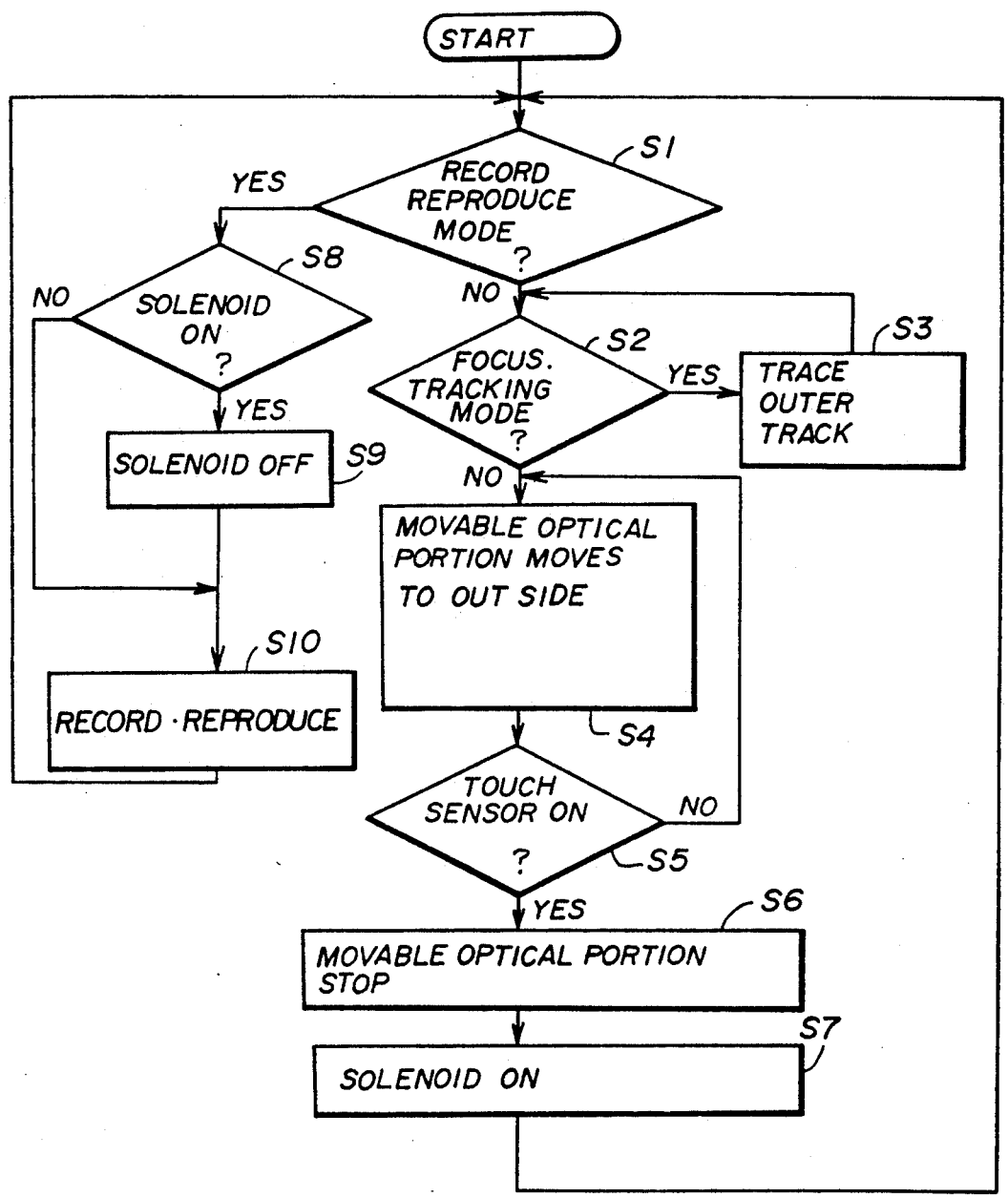
FIG. 4 is a flow chart of a processing executed by the control circuit shown in FIG. 3.

FIG. 4 is a flow chart showing the processing executed by the control circuit 25 shown in FIG. 3.

A description will now be given of a dust prevention operation performed by the control circuit 25 with reference to this flowchart. The control circuit 25 checks (S1) whether or not a recording and reproduction mode command has been given, and shifts to S2 if there is no command for the recording and reproduction mode in S1. The control circuit 25 determines whether or not the movable optical portion 18 is performing the focusing or tracking operation (S2). More specifically hen the result obtained in S2 is No, the optical disk apparatus is maintained in a mode, other than the recording and reproduction mode such as the idle mode. In S3, the control circuit 25 drives the motor 26 to shift the movable optical portion 18 to the position where it traces the track on the outermost periphery of the optical disk 15 (not shown for the sake of simplicity).

Figure 5:
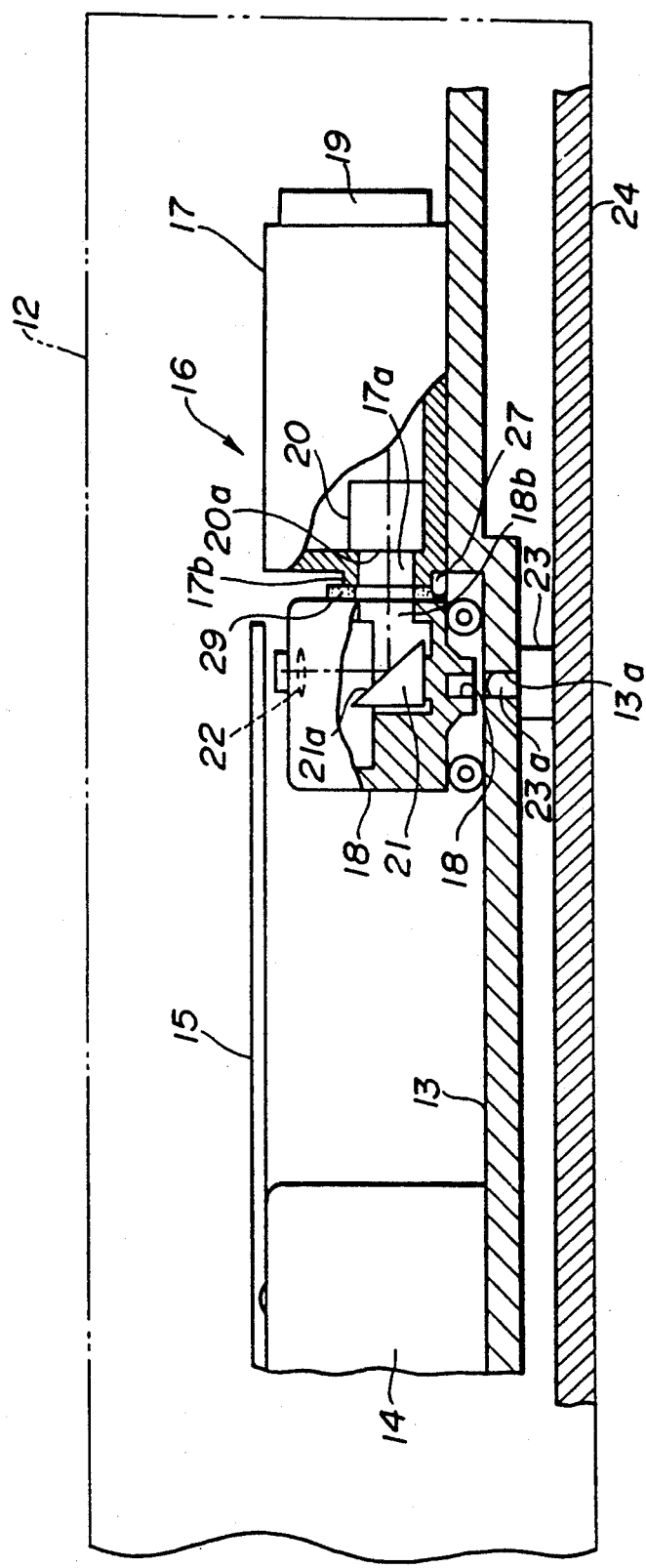
FIG. 5 is a longitudinal sectional view for explaining the operation of the optical disk apparatus which is set to an idle mode.

FIG. 5 shows a state where the movable optical portion 18 has moved to the position of the track on the outermost periphery and the optical disk apparatus is in the idle mode. When the movable optical portion 18 moves to the position of the track on the outermost periphery, the flexible member 29 comes into contact with the touch sensor 27. The touch sensor 27 outputs a detection signal to the control circuit 25, so that ti is informed of the fact that the flexible member 29 is located on the track on the outermost periphery. The movement of the movable optical portion 18 is buffered by the flexible member 29 so that the stationary optical portion 17 and the movable optical portion 18 are not damaged. Operation such as this makes the aperture 17a of the stationary optical portion 17 and the aperture 18b of the movable optical portion 18 come into contact and connect so that the aperture 17a and the aperture 18b are in close contact via the ring-shaped flexible member 29. Accordingly, the aperture 17a of the stationary optical portion 17 and the aperture 18b of the movable optical portion 18 are mutually blocked off from the outside. Therefore, dust inside the apparatus is prevented from entering into the stationary optical portion 17 and the movable optical portion 18 through the aperture 17a and 18b, and it is possible to prevent the light emitting surface 20a of the beam splitter 20 and the reflector surface 21a of the prism 21 from being contaminated by dust.

When it s determined, in S2, that the movable optical portion 18 is performing neither tracking operation or focusing operation, it is operating in the save mode or the stop mode. The control shifts to S4, in which the motor 26 is driven and the movable optical portion 18 shifts to the outer side of the optical disk 15, that is, to the side of the stationary optical portion 17. Following this, the touch sensor 27 turns on, and there is a check for whether the movable optical proton 18 has been detected (S5). when the movable optical portion 18 moves to the contact position of the stationary optical portion 17, the touch sensor 27 turns on, as has been described before, and the motion of the movable optical portion 18 is detected. The control circuit 25 stops the motor 26 (S6) when the stationary optical portion 17 is detected by the touch sensor 27. After this, the application of a magnetic force by the solenoid 23 engages the lock pin 23a with the concave portion 18a of the movable optical portion 18, so that the moving optical portion 18 is definitely fixed (S7). Therefore, the stationary optical portion 17 and the movable optical portion 18 are held in the status shown in FIG. 6 where the apertures 17a and 18b are in the status of close contact. Accordingly, dust is prevented from entering the light emitting surface 20a of the beam splitter 20 and the reflector surface 21a of the prism 21.

Figure 6:
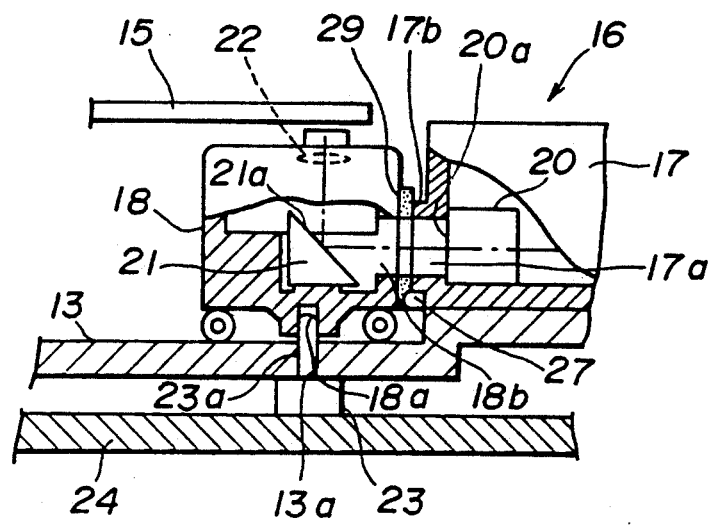
FIG. 6 is a longitudinal sectional view for explaining the operation of the optical disk apparatus which is set to a stop mode or save mode.

The processing consisting of steps S1 through S3 described above is continuously performed for when non-operation status there is a mode other than the recording and reproduction mode, that is, the idle mode, the save mode or the stop mode, and the movable optical portion 18 is held at a position shown in FIG. 5 or FIG. 6 where it is in contact with the stationary optical portion 17.

The operation of the control circuit 25 shifts to S8 when it is determined that the optical disk apparatus is operating in the recording and reproduction mode. In S8, it is judged whether or not the solenoid 23 is operating. As has already been described, the solenoid 23 is magnetized in the processing of S7. When the solenoid 23 is in the on status, it is turned off in the processing of S9. After this, the optical disk apparatus 11 enters the recording and reproduction mode and the movable optical portion 18 is driven by the motor 26 and shifts in the direction of the inner periphery of the disk, and recording and reproduction operation is performed (S10). In addition, the processing of S10 is directly performed when the solenoid 23 is in the off status in the processing of S8.

Figure 7:
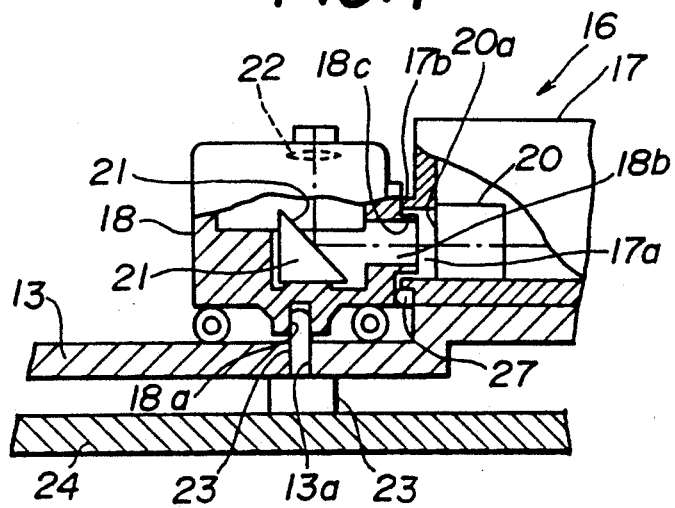
FIG. 7 is a longitudinal sectional view of an optical disk apparatus according to a second embodiment of the present invention.

FIG. 7 is a longitudinal sectional view of an optical disk apparatus according to a second embodiment of the present invention. In FIG. 7, the outer periphery of the aperture 18b of the movable optical portion 18 is provided with a ring-shaped projecting portion 18c, which extends toward the stationary optical portion 17. The aperture of the stationary portion 17 is provided with ring-shaped projecting portion 17b. The projecting portion 18c has a diameter which is smaller than the aperture 17a of the stationary optical portion 17 and when the movable optical portion 18 is in contact with the stationary optical portion 17, enters into the aperture 17a. Accordingly, the projecting portion 18c of the movable optical portion 18 engages with the projecting portion 17b between the stationary optical portion 17 and the movable optical portion 18, and the aperture 17a and the aperture 18a are blocked off from alighting on the outside, and dust is prevented from the light emitting surface 20a of the beam splitter 20 and the reflector surface 21a of the prism 21.

Figure 8:
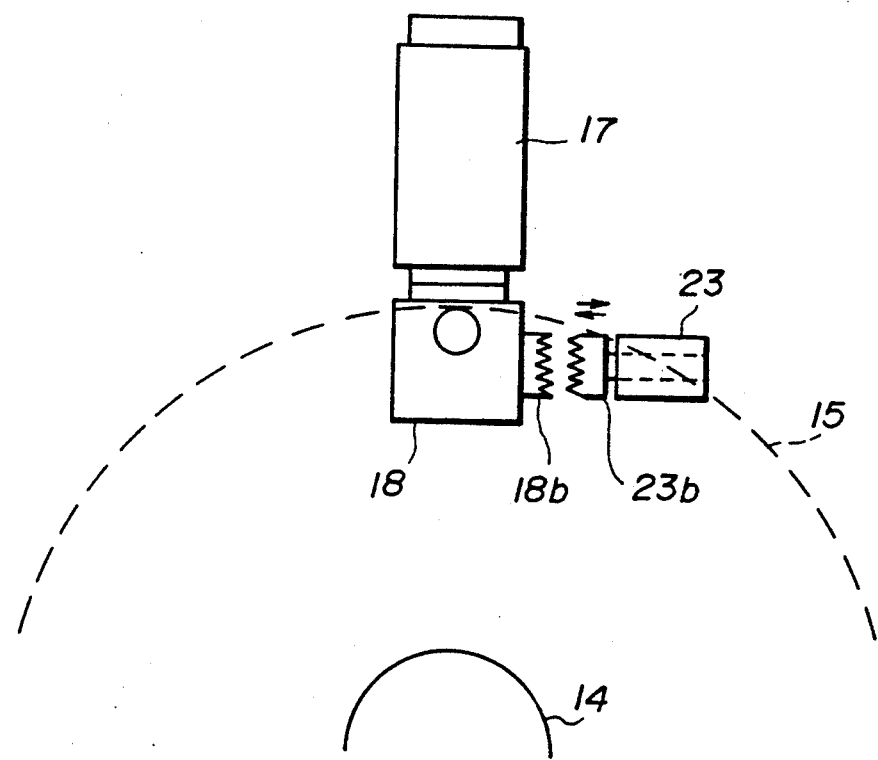
FIG. 8 is a longitudinal sectional view of an optical disk apparatus according to a third embodiment of the present invention.

FIG. 8 is a longitudinal sectional view of a third embodiment of the optical disk apparatus of the present invention. The bottom surface of the movable optical portion 18 is provided with a tooth 18b and a solenoid 23 is provided so as to oppose this tooth 18b.

The solenoid 23 has a tooth 23b so as to engage the tooth 18b provided on the side surface of the movable optical portion 18. When the solenoid 23 is magnetized, the tooth 23b moves to the sideways direction so that the engagement with the tooth 18b of the movable optical portion 18 stops the movable optical portion 18.

Moreover, in the embodiments described above, a mode other than the recording and reproduction mode, that is, the idle mode, the save mode and the stop mode is detected and if there is not the recording and reproduction mode, the movable optical portion 18 is brought into close contact with the stationary optical portion 17 but the present invention is not limited to this, as for example, the laser emission detection means that detects whether the disk is mounted can detect whether there is the recording and reproduction mode.

The present invention is not limited to the embodiments described above, and various modifications and alterations are possible within the scope of the appended claims.

What is claimed is:

1. An optical disk apparatus comprising:
   a stationary optical portion having a light source and a first opening through which a beam emitted from said light source passes;
   a movable optical portion which moves linearly with respect to said stationary optical portion and which receives said beam from said light source through a second opening of said movable optical portion and irradiates said beam to an optical disk;
   detection means for detecting a predetermined operative state of said optical disk apparatus in which the apparatus is neither recording nor reproducing;
   control means for moving said movable optical portion to a contact position in which said movable optical portion is in contact with said stationary optical portion when said detection means detects said predetermined operative state; and
   sealing means operatively associated with at least one of said movable and stationary optical portions and interposable between said movable and stationary portions for forming a seal about said first and second openings only when said movable optical portion is in said contact position.

2. An optical disk apparatus as claimed in claim 1, wherein said control means comprises:
   a motor for linearly moving said movable optical portion;
   motor control means for controlling said motor so that said movable optical portion moves to said contact position;
   contact detection means for detecting a state where said movable optical portion is in contact with said stationary optical portion; and
   fixing means for fixing said movable optical portion at said contact position when said contact detection means detects said state where said movable optical portion is in contact with said stationary optical portion.

3. An optical disk apparatus as claimed in claim 2, wherein said contact detection means generates a digital detection signal when said contact detection means senses that said movable optical portion is in contact with said stationary optical portion, and
   wherein said control means comprises digital-to-analog converter means for converting said digital detection signal into an analog signal supplied to said motor.

4. An optical disk apparatus as claimed in claim 2, wherein:
   said movable optical portion has a concave portion; and
   said fixing means comprises solenoid means having a movable projection, for engaging said movable projection with said concave portion so that said movable optical portion is fixed at said contact position.

5. An optical disk apparatus as claimed in claim 1, wherein:
   said stationary optical portion comprises a ring-shaped projection formed around said first opening and projecting toward said movable optical portion; and said ring-shaped projection has a diameter approximately equal to or smaller than that of said second opening of said movable optical portion.

6. An optical disk apparatus as claimed in claim 1, wherein:
said stationary optical portion comprises a first ring-shaped projection formed around said first opening of said stationary optical portion;
said movable optical portion comprises a second ring-shaped projection formed around said second opening of said movable optical portion;
said second ring-shaped projection has a size smaller than that of said first ring-shaped projection; and
said second ring-shaped projection is inserted into said first ring-shaped projection when said movable optical portion is located at said contact position.

7. An optical disk apparatus-s as claimed in claim 2, wherein:
said movable optical portion has a first tooth portion; and
said fixing means comprises solenoid means having a second movable tooth portion, for engaging said second movable tooth portion with said first tooth portion so that said movable optical portion is fixed at said contact position.

8. An optical disk apparatus as claimed in claim 1, wherein said detection means comprises means for determining whether or not said optical disk apparatus is operating in a focusing/tracking mode and for concluding that said optical disk apparatus is in said predetermined operative state when it is determined that said optical disk is not operating in said focusing/tracking mode.

9. An optical disk apparatus as claimed in claim 1, wherein said detection means comprises means for determining whether or not said optical disk is located in position and for concluding that said optical disk apparatus is in said predetermined operative state when it is determined that said optical disk is not located in position.

10. An optical disk apparatus as claimed in claim 1, wherein said detection means comprises means for determining whether or not the beam is being emitted from said light source and for concluding that said optical disk apparatus is in said predetermined operative state when it is determined that the beam is not being emitted from said light source.

11. An optical disk apparatus as claimed in claim 2, wherein said contact detection means comprises a touch sensor which is provided on said stationary optical portion and which senses contact with said movable optical portion.

12. An optical disk apparatus as claimed in claim 2, wherein said contact detection means comprises an optical sensor having an optical path which is interrupted when said movable optical portion is located at said contact position.

13. An optical disk apparatus as claimed in claim 1, wherein said sealing means further comprises a buffer member formed around at least one of said first opening and said second opening.

* * * * *

UNITED STATES PATENT AND TRADEMARK OFFICE
CERTIFICATE OF CORRECTION

PATENT NO. : 5,208,794
DATED : May 4, 1993
INVENTOR(S) : Akira Mashimo

It is certified that error appears in the above-identified patent and that said Letters Patent is hereby corrected as shown below:

CLAIM 7, Col. 7, Line 20, delete "apparatus-s" and substitute therefor ---apparatus---.

Signed and Sealed this

Eleventh Day of January, 1994

Attest:

BRUCE LEHMAN

Attesting Officer         Commissioner of Patents and Trademarks